United States Patent
Maiocchi

(10) Patent No.: US 9,780,703 B2
(45) Date of Patent: Oct. 3, 2017

(54) POWER SUPPLY FOR MULTIPHASE MOTOR PROVIDING RECIRCULATION COMPENSATION FEATURES AND RELATED METHODS

(71) Applicant: STMICROELECTRONICS S.r.l., Agrate Brianza (IT)

(72) Inventor: Giuseppe Maiocchi, Capiago Intimiano (IT)

(73) Assignee: STMicroelectronics S.r.l., Agrata Brianza (MB) (IT)

( * ) Notice: Subject to any disclaimer, the term of this patent is extended or adjusted under 35 U.S.C. 154(b) by 86 days.

(21) Appl. No.: 14/824,193

(22) Filed: Aug. 12, 2015

(65) Prior Publication Data

US 2017/0047871 A1    Feb. 16, 2017

(51) Int. Cl.
G05B 15/02       (2006.01)
H02P 6/00        (2016.01)

(52) U.S. Cl.
CPC .................. *H02P 6/002* (2013.01)

(58) Field of Classification Search
CPC ............ H02P 5/74; H02P 6/006; H02M 5/458
USPC ........... 318/400.26, 490, 600, 376; 341/143; 701/19, 49
See application file for complete search history.

(56) References Cited

U.S. PATENT DOCUMENTS

| | | |
|---|---|---|
| 5,216,347 A | 6/1993 | Pace et al. |
| 2008/0167779 A1* | 7/2008 | Suzuki ............... B62D 5/046 701/42 |
| 2013/0003418 A1 | 1/2013 | Motegi |
| 2013/0049670 A1* | 2/2013 | Terada ............ H04L 12/40013 318/601 |
| 2013/0154531 A1* | 6/2013 | Furutani ................ B60L 7/14 318/400.26 |
| 2013/0278197 A1* | 10/2013 | Sasaki .................. H02P 23/00 318/490 |

* cited by examiner

*Primary Examiner* — Jorge L Carrasquillo
*Assistant Examiner* — Cortez Cook
(74) *Attorney, Agent, or Firm* — Slater Matsil, LLP

(57) ABSTRACT

A power supply may include power generation circuits, each configured to drive a respective winding of a multiphase motor; converter circuits, each configured to generate a digital driving signal for a respective power generation circuit, and a memory configured to store a plurality of fast recirculation compensation values corresponding to combinations of the digital driving signals that would otherwise result in a fast recirculation condition. The power supply may also include a controller coupled to the memory and configured to determine when a given combination of the digital driving signals would otherwise result in a fast recirculation condition, and based upon the determination, substitute at least one corresponding fast recirculation compensation value for the given combination of the digital driving signals.

17 Claims, 10 Drawing Sheets

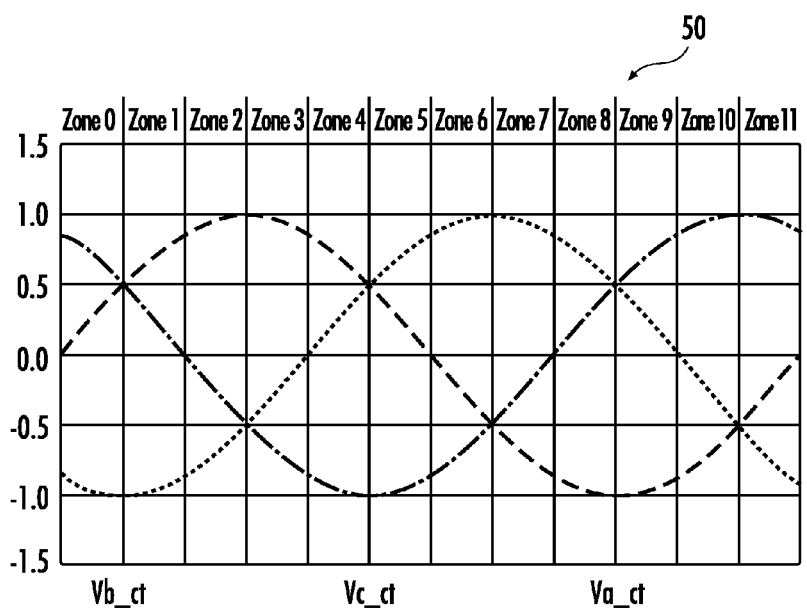
FIG. 2
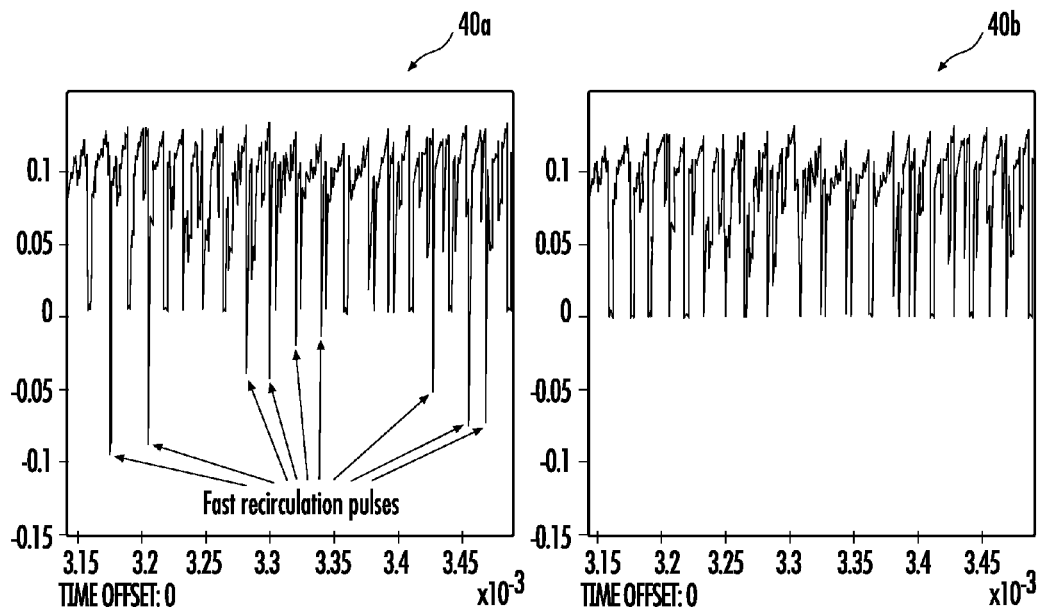
FIG. 3a
FIG. 3b

POWER SUPPLY FOR MULTIPHASE MOTOR PROVIDING RECIRCULATION COMPENSATION FEATURES AND RELATED METHODS

TECHNICAL FIELD

The present invention relates to the field of power supplies, and more particularly, to power supply devices which may be used for multiphase motors, for example, and related methods.

BACKGROUND

Power supplies are used to drive electric motors in a variety of different applications. For example, in computer hard disk drives, three-phase spindle motors are used to rotate the optical disk for reading and writing operations. Various types of power supply configurations are used for such applications. One such configuration is a pulse skip modulation (PSM) generator. In a typical configuration, input digital signals of N bits are converted into single bit PSM signals by a fixed frequency PSM converter based upon a comparison of the input signals with the instantaneous status of an up/down counter. The converted signals are single bit, fixed frequency and correlated with each other.

Another typical configuration is a signal delta generator. Here, input digital signals of N bits are converted into single bit signals by a sigma delta converter. The converted signals are single bit, they have a variable instantaneous frequency, and are uncorrelated with one another.

Despite the existence of such configurations, further enhancements in power supplies may be desirable in certain applications.

SUMMARY

A power supply is provided for a multiphase motor including a plurality of windings. The power supply may include a plurality of power generation circuits each configured to drive a respective winding of the multiphase motor, a plurality of converter circuits each configured to generate a digital driving signal for a respective power generation circuit, and a memory configured to store a plurality of fast recirculation compensation values corresponding to combinations of the digital driving signal that would otherwise result in a fast recirculation condition. The power supply may also include a controller coupled to the memory and configured to determine when a given combination of the digital driving signals would otherwise result in a fast recirculation condition, and based upon the determination, substitute at least one corresponding fast recirculation compensation value for the given combination of the digital driving signals.

More particularly, the multiphase motor may include a rotor configured to rotate based upon the windings, and the combinations of the digital driving signals that would otherwise result in a fast recirculation condition may be different for different zones of electrical position of the rotor. Furthermore, each of the converter circuits may comprise a sigma delta converter circuit. Additionally, the digital driving signals may be uncorrelated with one another. By way of example, the plurality of power generation circuits may be coupled to a universal serial bus (USB) voltage. Each of the power generation circuits may comprise a half bridge circuit, for example. The fast recirculation compensation values may be stored in a lookup table in the memory, for example.

A related system is also provided which may include a multiphase motor including a plurality of windings, and a power supply, such as the one described briefly above. A related method for using such a power supply to power a multiphase motor including a plurality of windings is also provided. The method may include storing in a memory a plurality of fast recirculation compensation values corresponding to combinations of the digital driving signals that would otherwise result in a fast recirculation condition, determining when a given combination of the digital driving signals would otherwise result in a fast recirculation condition, and based upon the determination, substituting at least one corresponding fast recirculation compensation value for the given combination of the digital driving signals.

BRIEF DESCRIPTION OF THE DRAWINGS

FIG. 2 is a graph of different voltages across the motor windings and zone divisions for rotor electrical position in an example implementation of the system of FIG. 1.

FIGS. 3a and 3b respectively are graphs of simulated voltage across the motor of FIG. 1 with fast recirculation current allowed, and with fast recirculation current compensation enabled in accordance with an example embodiment.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 12:
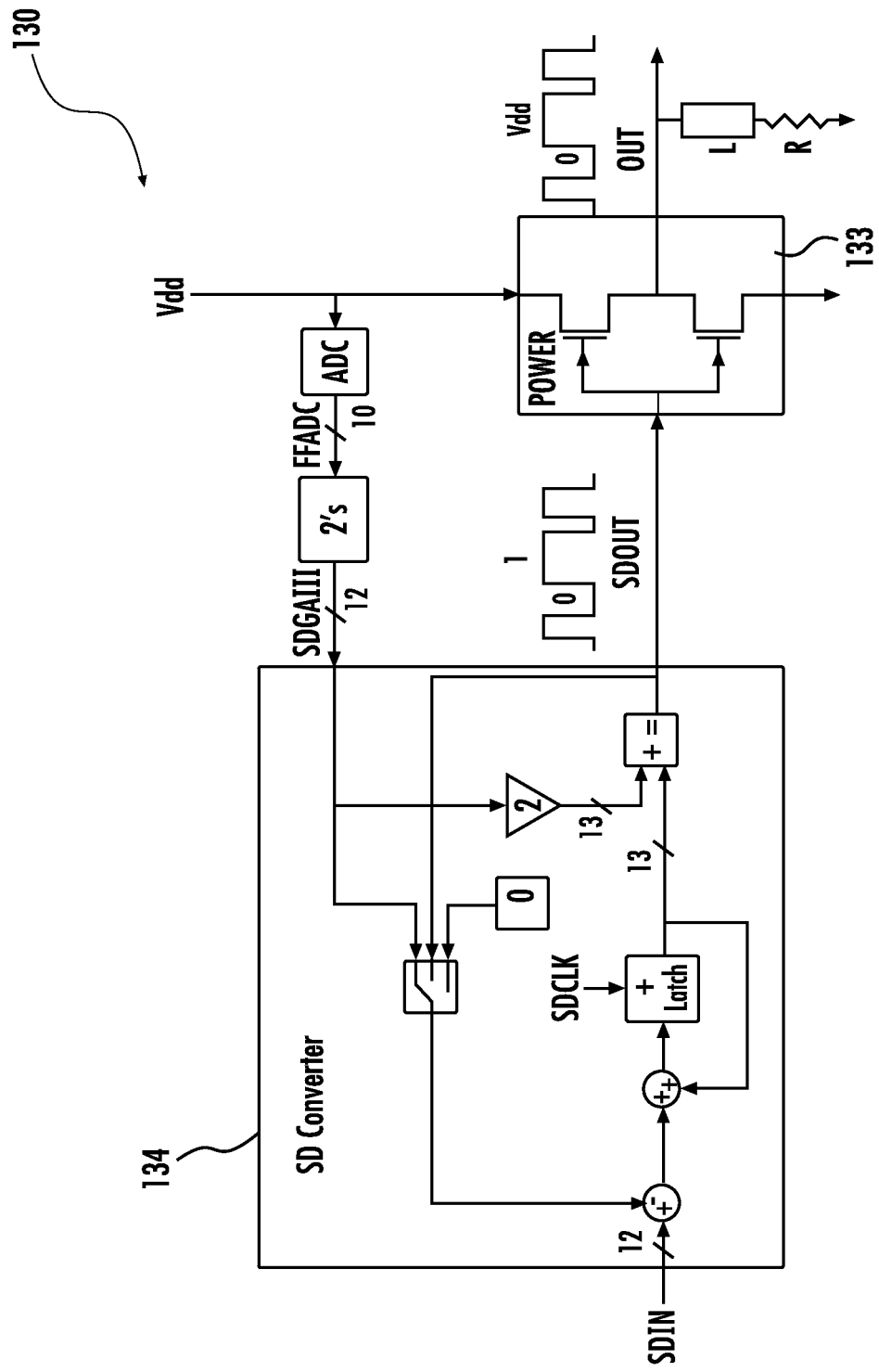
FIG. 12 is a schematic circuit diagram of a prior art power supply including a sigma delta converter and associated half bridge power driving stage.

Referring initially to FIG. 12, a conventional power supply 130 is first described which illustratively includes a power block 133 and an associated single sigma delta (SD) converter block 134. The SD converter block 134 performs a conversion of the n-bit input signal SDIN (n=12 in FIG. 12) into an output signal SDOUT whose average value is proportional to the actual value of the input signal SDIN. The output signal SDOUT then feeds the half bridge power block 133 to generate the powered output signal OUT that reflects the duty cycle of the output signal SDOUT, but with a higher voltage and current capability. The output signal OUT drives a single phase load, which is illustrated as an inductor L and resistor R. Further details on this type of SD converter block arrangement may be found in U.S. Pat. No. 8,018,364 to Maiocchi, which is assigned to the present Applicant and is hereby incorporated herein in its entirety by reference.

As will be discussed further with reference to FIG. 1 below, the SD converter block 134 may be used in a multiphase motor where M indicates the number of motor phases. In such configurations, the SD converter block 134 is replicated M times so that each SD converter block drives a single motor phase. More particularly, the converted signals SDOUTx are single bit, have a variable instantaneous frequency, and are uncorrelated with each other. As such, since each phase winding is independently driven by its own SD converter 134, it is possible that some instantaneous combinations of the voltages OUTx at two or more motor windings may activate a current path that makes the current recirculate back to power supply.

Figure 13:
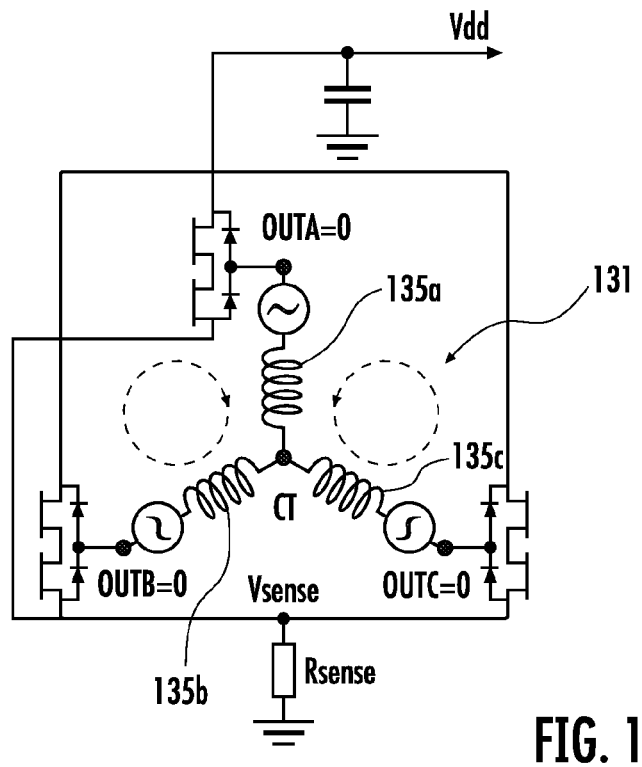
FIG. 13 is a circuit diagram illustrating a multiphase motor being driven by the power supply of FIG. 12 during a slow recirculation current event.
Figure 14:
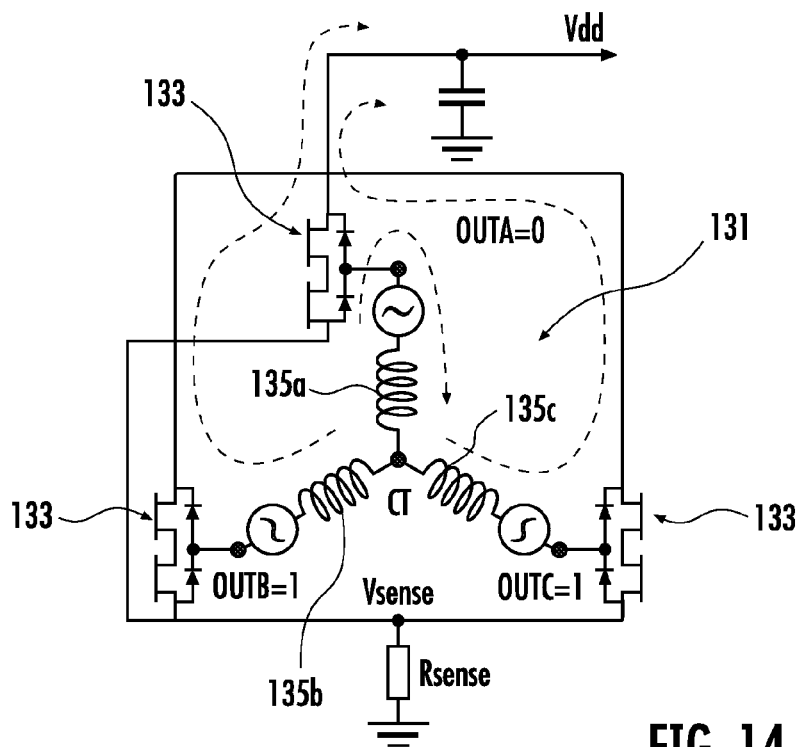
FIG. 14 is a circuit diagram illustrating the multiphase motor of FIG. 13 being driven by the power supply of FIG. 12 during a fast recirculation current event.

By way of example, in FIGS. 13 and 14 a three-phase motor (i.e., M=3) includes windings 135a-135c which respectively receive output signals OUTA, OUTB, and OUTC from respective power blocks 133. In the example of FIG. 13, the instantaneous combination of logic signals SDOUTA=0, SDOUTB=0, SDOUTC=0, which respectively generates powered signals OUTA=0, OUTB=0, OUTC=0 at the three motor phases 135a-135c, results in a slow recirculation path, as demonstrated by the dashed circular arrows. That is, the recirculation current flows through the lower DMOS transistor of each power stage 133 and does not go back to the power supply (i.e., the power supply providing the voltage Vdd).

However, in the example of FIG. 14, the instantaneous combination of the same logic signals SDOUTA=0, SDOUTB=1, SDOUTC=1 that generates powered signals OUTA=0, OUTB-Vcc, OUTC=Vcc instead causes a fast recirculation path, as illustrated by the dashed arrows. That is, the recirculation current through the upper DMOS of the illustrated power stage 133 flows back to the power supply. This is evidenced also by sensing the voltage at a sense resistor Rsense, where the fast recirculation of the current back to power supply generates negative pulses, as seen in the graph 40a of FIG. 3a. In certain applications, such as those where the power supply is sourced by a universal serial bus (USB) driver, for example, if the motor current is pushed back to this type of power supply it may damage the USB driver.

Figure 1:
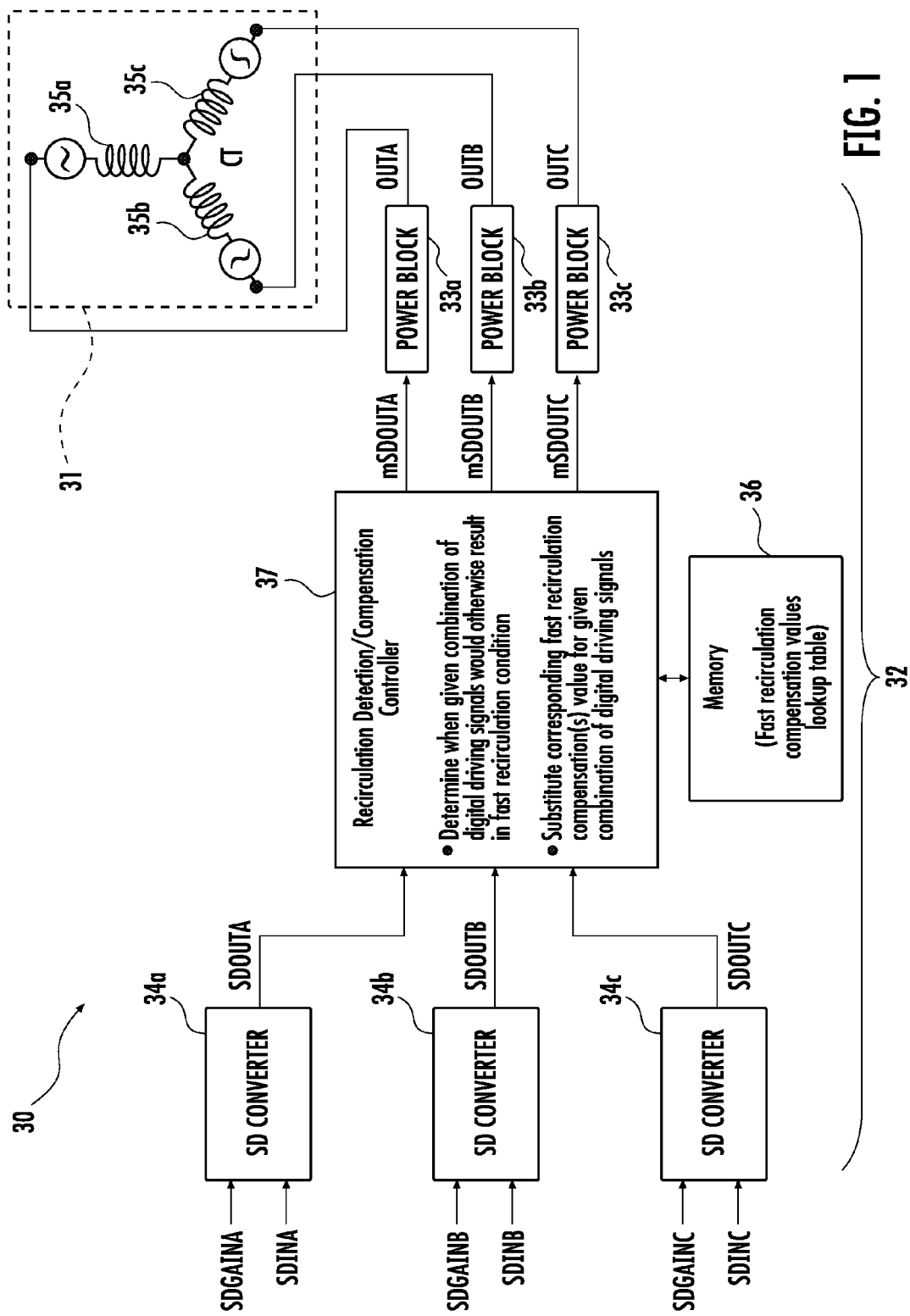
FIG. 1 is a schematic block diagram of a system including a three-phase motor and associated power supply therefor providing fast recirculation compensation features in accordance with an example embodiment.

Turning now to FIG. 1, a system 30 in accordance with an example embodiment illustratively includes a multiphase motor 31 (here a three-phase motor) with windings 35a-35c and an associated power supply 32. The power supply 32 illustratively includes a plurality of power generation circuits or power blocks 33a-33c each configured to drive a respective winding of the motor 31 as shown. By way of example, the power blocks 33a-33c may be the same as the half bridge power blocks 133 shown in FIG. 12, although other suitable power blocks may be used in different embodiments. Furthermore, the power supply 32 also illustratively includes a plurality of converter circuits 34a-34c each configured to generate a digital driving signal for a respective power generation circuit 33a-33c. Here again, the converter circuits 34a-34c may be the same as the SD converters 134 as shown in FIG. 12, although different converters may be used in different configurations.

By way of example, the system 30 may be used in hard disk drives, which typically use three-phase spindle motors, although it may be used in other electric motor configurations as well. Among the many requirements for a hard disk drive application, spindle motor driving should generally not interfere with other sensitive circuits present in the same power supply, and also should not inject noise or power back into the power supply, particularly when the hard disk drive is directly powered from a USB driver, as noted above. As such, the above-described fast current recirculation conditions may not be acceptable for such applications.

To help avoid the fast current recirculation problems discussed above with conventional SD converter configurations, the power supply 32 further illustratively includes a memory 36 configured to store a plurality of fast recirculation compensation values corresponding to combinations of the digital driving signal that would otherwise result in a fast recirculation condition, and a recirculation detection/compensation controller 37 coupled to the memory. Generally speaking, the controller 37 essentially intercepts the output signals SDOUTA, SDOUTB, SDOUTC and detects combinations that, in specific known conditions, would otherwise activate the fast recirculation of motor currents back to the power supply. These combinations are intercepted and corrected, and properly modified signals mSDOUTA, mSDOUTB, mSDOUTC are instead provided to the power blocks 33a-33c so that the resulting signals OUTA, OUTB, OUTC avoid the fast recirculation conditions, and a slow current recirculation among the low side (or high side) power DMOS transistor of each power block is instead achieved, as discussed above.

Referring additionally to FIG. 2, a certain logic status combination of signals SDOUTA, SDOUTB, SDOUTC may result in a fast current recirculation to the power supply when, concurrently, there is a certain phase relation of differential voltages Va_ct, Vb_ct, Vc_ct across each motor winding 35a-35c. However, it may also be that the same combination of logic status signals SDOUTA, SDOUTB, SDOUTC generates a slow recirculation when there is a different phase relation among the same differential voltages Va_ct, Vb_ct, Vc_ct. So to intercept, and correct, the fast recirculation event it may be desirable to monitor either the instantaneous logic status of sigma delta output signals SDOUTA, SDOUTB, SDOUTC or the instantaneous phase relation among voltages Va_ct, Vb_ct, Vc_ct.

Voltage profiles Va_ct, Vb_ct, Vc_ct have been divided into several zones (e.g., 6 or 12 zones). Within each zone the phase relation among voltage profiles Va_ct, Vb_ct, Vc_ct may be considered homogeneous when compared to signals SDOUTA, SDOUTB, SDOUTC to intercept fast recirculation events. In FIG. 2, a plot 50 is provided of the differential voltages Va_ct, Vb_ct, Vc_ct across each motor winding 35a-35c and the zones (12 zones in the illustrated example). Because differential voltages Va_ct, Vb_ct, Vc_ct across each motor winding 35a-35c are generated by the absolute voltage profiles at motor windings that are under control, the zone where the voltage profiles are at every moment is known.

Referring additionally to FIGS. 6-9, common voltage profiles are provided which are utilized in driving spindle motors for hard disk drives. For the profiles I and II shown in FIGS. 6 and 7, it is sufficient to divide these profiles into six zones, yet still properly intercept the fast recirculation events. For the profiles III and IV of FIGS. 8 and 9, twelve zones are used, which is mainly due to the presence in profiles I and II of a not-switching zone and to the absence of this not-switching zone in profiles III and IV.

Figure 10:
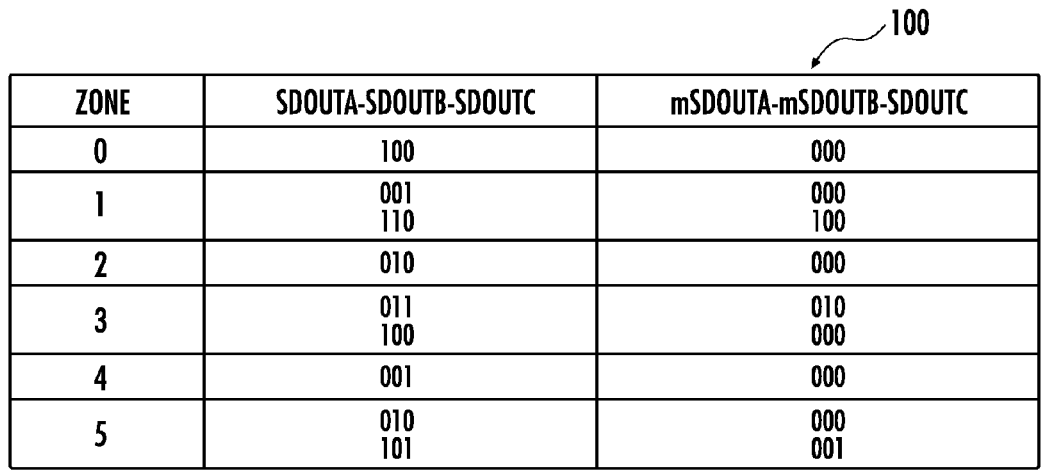
FIG. 10 is a lookup table of example fast recirculation compensation codes at different zones for the voltage profiles I and II of FIGS. 6 and 7.
Figure 11:
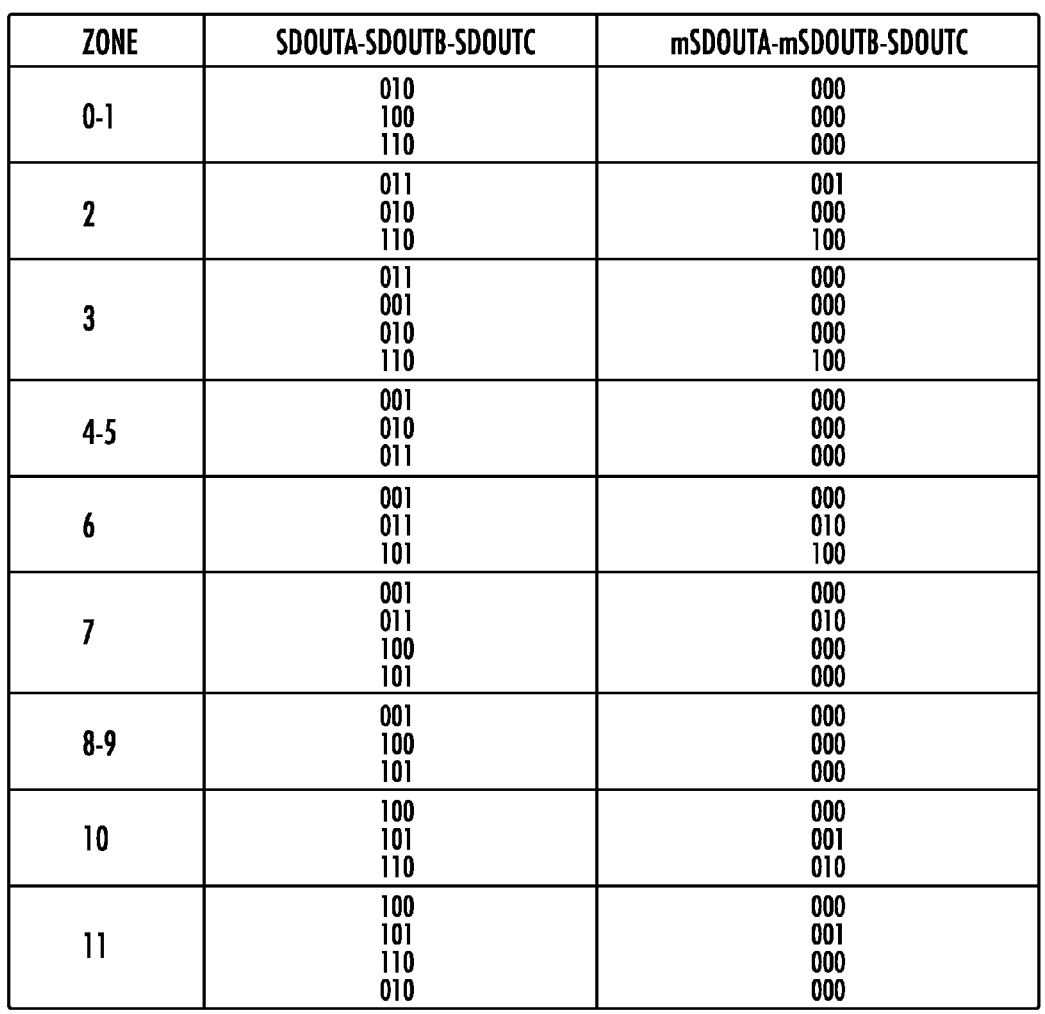
FIG. 11 is a lookup table of example fast recirculation compensation codes at different zones for voltage profiles III and IV of FIGS. 8 and 9.

The controller 37 may perform the following operations. First, the controller 37 identifies the specific instantaneous logic status of the signals SDOUTA, SDOUTB, SDOUTC that, combined with the specific zone where the rotor of the motor 31 is positioned, would otherwise result in a motor current fast recirculation event. Moreover, once this combination of the signals SDOUTA, SDOUTB, SDOUTC is identified for the given zone, the signals SDOUTA, SDOUTB, SDOUTC are intercepted and properly modified as shown in the tables of FIGS. 10 and 11 to provide substitute signals mSDOUTA, mSDOUTA, mSDOUTC. As a result, the powered signals OUTA, OUTB, OUTC at the motor windings 35a-35c are the powered replicas of the signals mSDOUTA, mSDOUTB, mSDOUTC instead of the signals SDOUTA, SDOUTB, SDOUTC. In this way, a slow recirculation is activated instead of a fast recirculation.

It may be seen that the voltage profiles SDOUTA, SDOUTB, SDOUTC (OUTA, OUTB, OUTC when powered) may have different shapes. Profiles I and II have the characteristic of having zones where one of the three phases is in a fixed high or low status, while profiles III and IV have a continuous driving of all the three motor phases. However, all of these profiles have the common property of generating differential sinusoidal profiles across each motor winding. So, by dividing the voltages across motor windings into zones, the originating absolute voltage profiles at the motor windings 35a-35c are divided into zones as well. For practicality, profiles I and II are divided into six zones, and profiles III and IV are divided into twelve zones, as noted above.

Within each of these zones, digital combinations of signals SDOUTA, SDOUTB and SDOUTC that would generate a fast recirculation to the power supply have been identified and provided in table 100 (FIG. 10) for profiles I and II, and into table 110 (FIG. 11) for profiles III and IV. So within each zone, as soon as the problematic sequence SDOUTA, SDOUTB, SDOUTC is detected, the modified or substitute signals mSDOUTA, mSDOUTB and mSDOUTC are fed to the associated power stage 33a-33c and to the SD feedback loop to force a slow recirculation instead of a fast one that would have otherwise occurred where the signals SDOUTA, SDOUTB and SDOUTC signal would have been given to their respective power stages instead. The fast recirculation compensation tables 100, 110 may advantageously be digitally mapped into a lookup table(s) which may be stored in the memory 36 for use by the controller 37 in performing the above-noted operations.

Figures 4A, 4B:
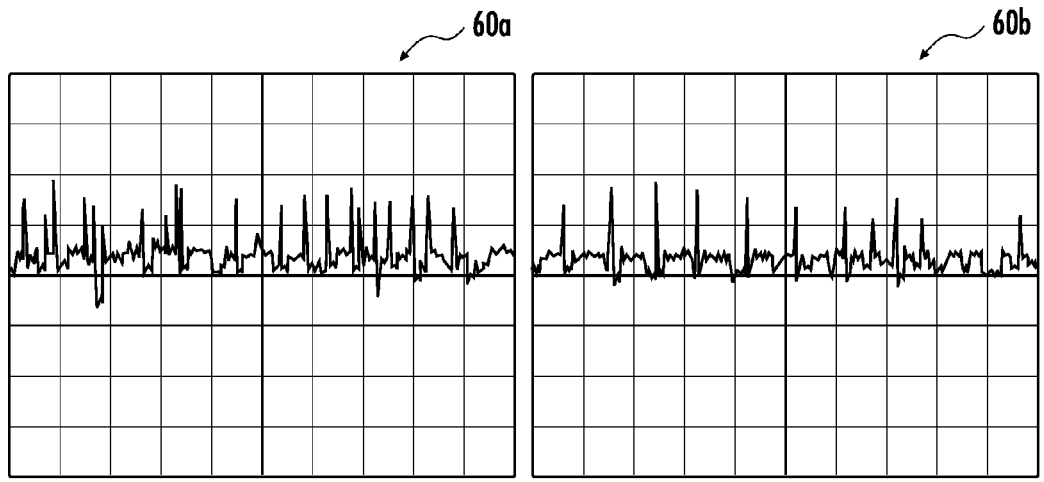
FIGS. 4a and 4b respectively are graphs of a voltage across a test motor configuration with fast recirculation current allowed, and with fast recirculation current compensation enabled in accordance with an example embodiment.
Figures 5A, 5B:
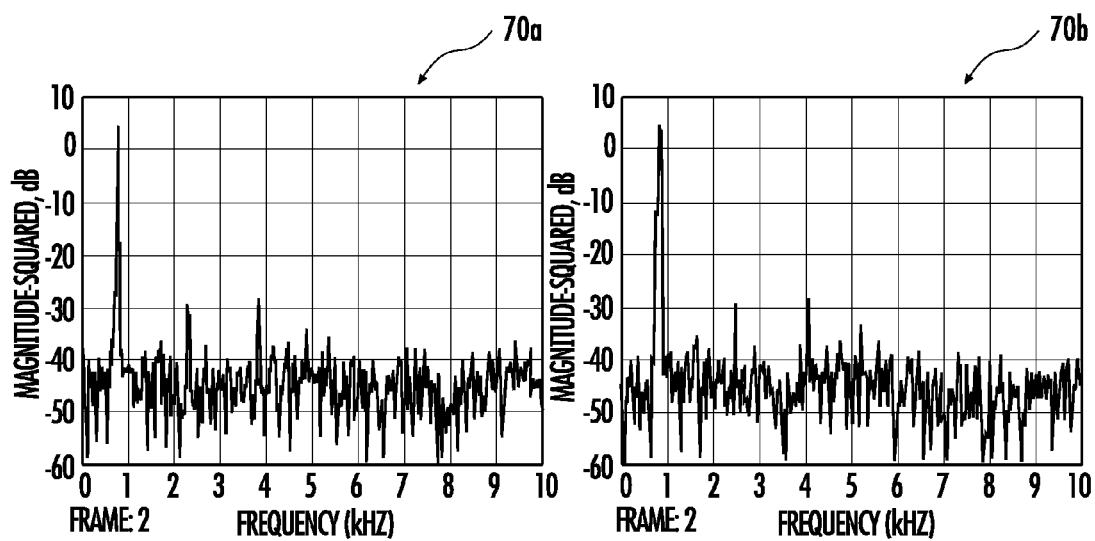
FIGS. 5a and 5b respectively are graphs of motor phase FFT with fast recirculation current allowed, and with fast recirculation current compensation enabled in accordance with an example embodiment.
Figure 6:
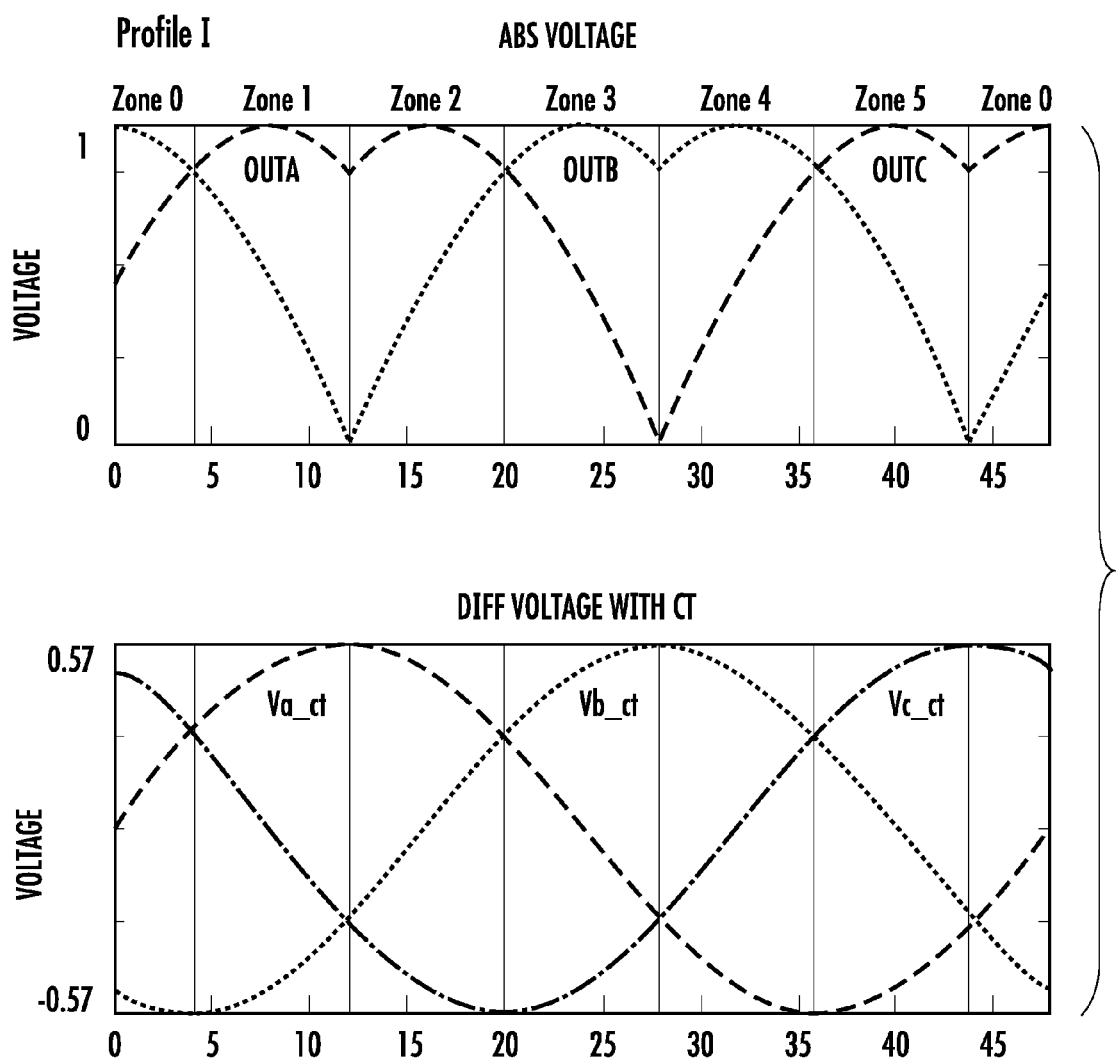
FIG. 6 is a series of graphs showing absolute and differential voltages for the motor of the system of FIG. 1 for a first voltage profile (I).
Figure 7:
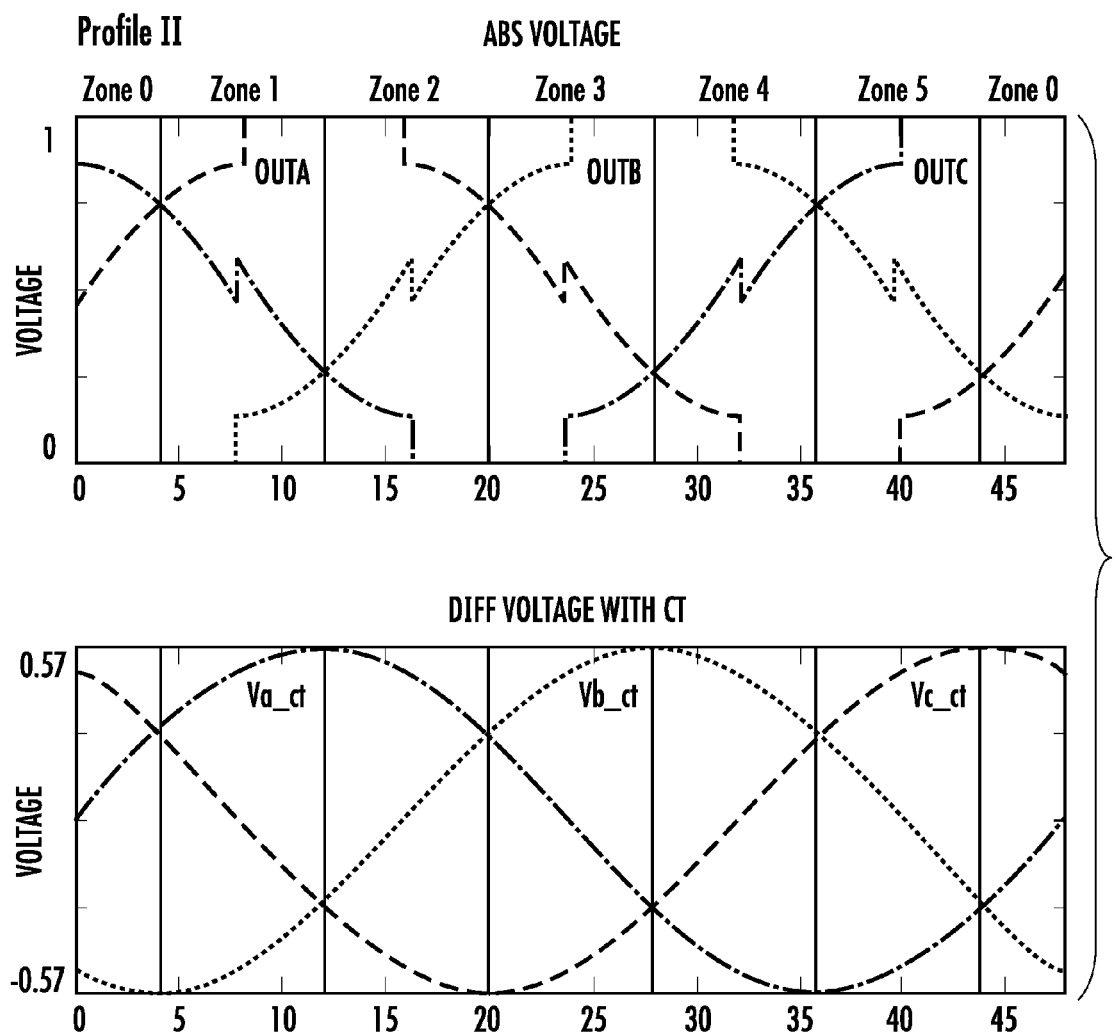
FIG. 7 is a series of graphs showing absolute and differential voltages for the motor of the system of FIG. 1 for a second voltage profile (II).
Figure 8:
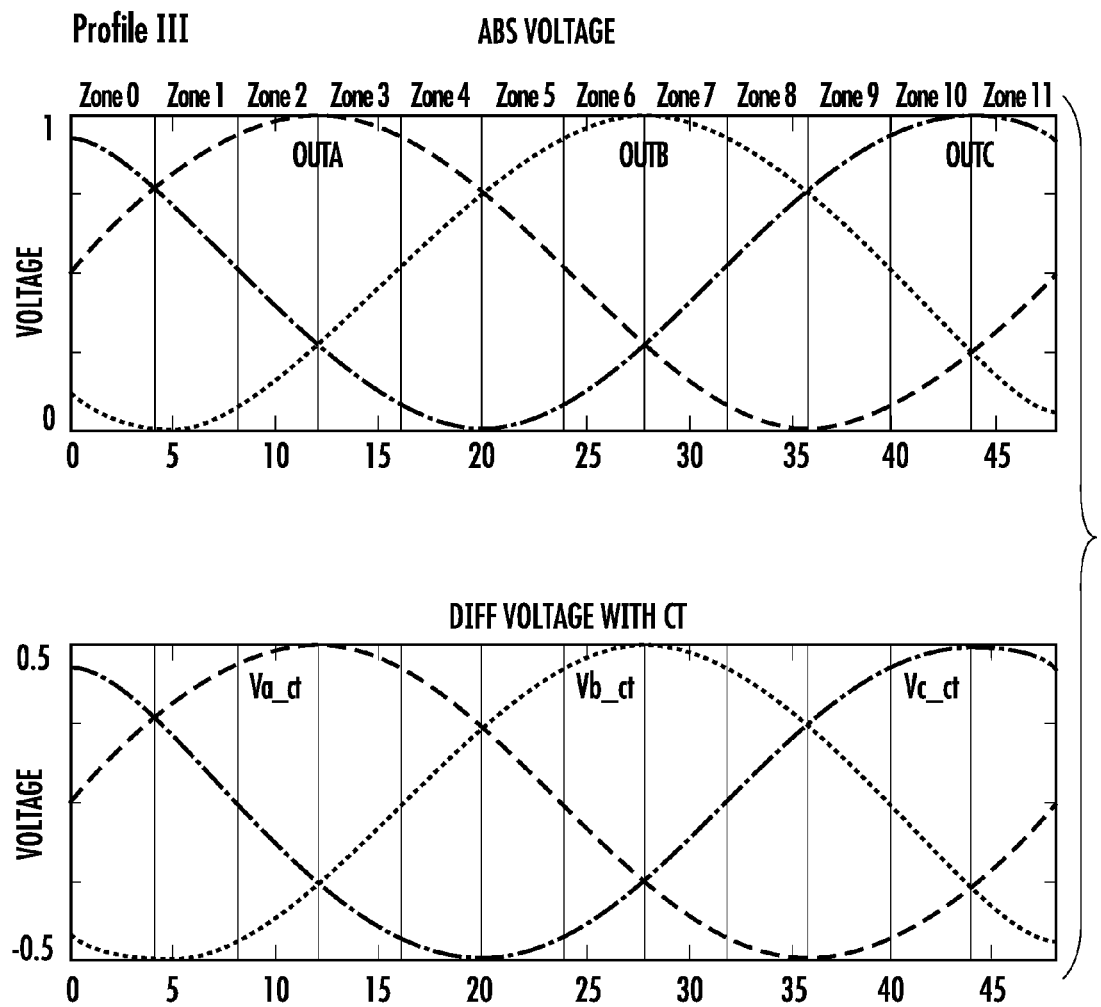
FIG. 8 is a series of graphs showing absolute and differential voltages for the motor of the system of FIG. 1 for a third voltage profile (III).
Figure 9:
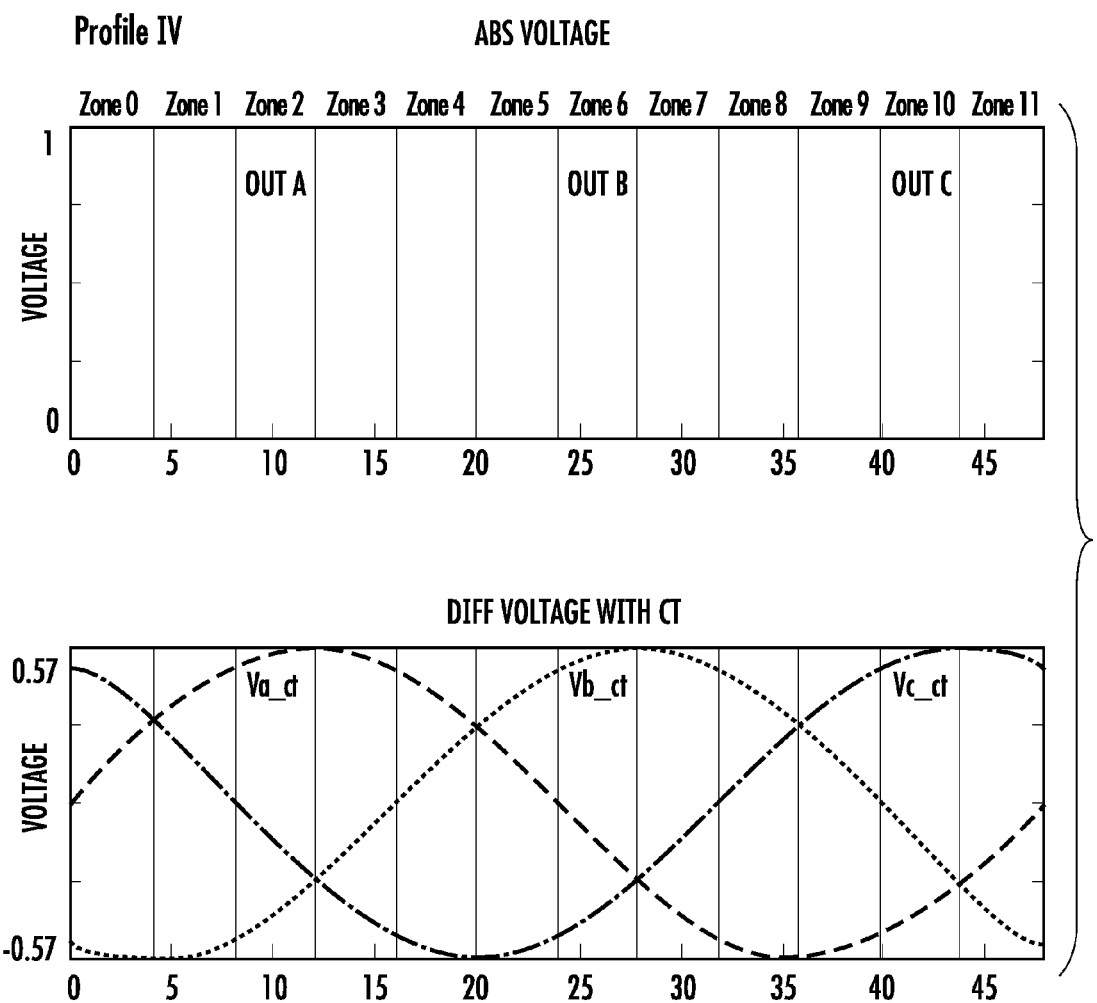
FIG. 9 is a series of graphs showing absolute and differential voltages for the motor of the system of FIG. 1 for a fourth voltage profile (IV).

The plot 40b of FIG. 3b shows simulated Vsense voltages across a sense resistance (see FIG. 14). It will be seen that, in contrast to the plot 40a of FIG. 3a with no fast recirculation compensation, the fast recirculation pulses are absent when the compensation is activated. Referring additionally to FIGS. 4a and 4b, plots 60a and 60b are plots of measured Vsense voltages across a sense resistance in a test configuration with and without fast recirculation, respectively. It will be noted that fast recirculation pulses are present when the compensation is not activated (FIG. 4a), and are absent when the compensation is activated (FIG. 4b). Turning to FIGS. 5a and 5b, plots 70a, 70b are of a motor phase current FFT that shows that the compensation does not degrade the quality of motor current in terms of harmonic distortion. No tone variations are present when the compensation is activated (FIG. 5b) as compared to when the compensation is not activated (FIG. 5a).

The above-described fast recirculation detection and compensation works at a relatively high frequency with respect to the electrical motor bandwidth. As such, it essentially acts as a dither noise generator so it does not introduce distortions in the electrical motor bandwidth, and it maintains current spectrum flatness as compared to a standard SD generator without correction.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A power supply for a multiphase motor comprising a plurality of windings, the power supply comprising:
   a plurality of power generation circuits configured to be coupled to a power source, each of the plurality of power generation circuits configured to drive a respective winding of the multiphase motor based on respective digital driving signals;
   a plurality of converter circuits each configured to generate respective digital driving signals for respective power generation circuits;
   a memory configured to store a plurality of fast recirculation compensation values corresponding to combinations of the digital driving signals that would avoid a fast recirculation condition, wherein the fast recirculation condition comprises current circulating through a winding of the plurality of windings and through a power generation circuit of the plurality of power generation circuits back to the power source;
   and a controller coupled to the memory and configured to determine when a given combination of the digital driving signals would result in the fast recirculation condition, and based upon the determination, substitute at least one corresponding fast recirculation compensation value for the given combination of the digital driving signals;
   wherein the multiphase motor comprises a rotor configured to rotate based upon the windings;
   and wherein the combinations of the digital driving signals that would avoid the fast recirculation condition are different for different zones of electrical position of the rotor.

2. The power supply of claim 1 wherein each of the converter circuits comprises a sigma delta converter circuit.

3. The power supply of claim 1 wherein the digital driving signals are uncorrelated with one another.

4. The power supply of claim 1 wherein the plurality of power generation circuits is configured to be coupled to a universal serial bus (USB) voltage.

5. The power supply of claim 1 wherein each of the power generation circuits comprises a half bridge circuit.

6. The power supply of claim 1 wherein the fast recirculation compensation values are stored in a lookup table in the memory.

7. A system comprising:
a multiphase motor comprising a plurality of windings;
and a power supply comprising a plurality of power generation circuits each configured to drive a respective winding of the multiphase motor,
a plurality of converter circuits configured to be coupled to a power source, each of the plurality of power generation circuits configured to generate a digital driving signal for a respective power generation circuit based on respective digital driving signals,
a memory configured to store a plurality of fast recirculation compensation values corresponding to combinations of the digital driving signals that would avoid a fast recirculation condition, wherein the fast recirculation condition comprises current circulating through a winding of the plurality of windings and through a power generation circuit of the plurality of power generation circuits back to the power source,
and a controller coupled to the memory and configured to determine when a given combination of the digital driving signals would result in the fast recirculation condition, and the fast recirculation condition, and based upon the determination, substitute at least one corresponding fast recirculation compensation value for the given combination of the digital driving signals;
wherein the multiphase motor comprises a rotor configured to rotate based upon the windings;
and wherein the combinations of the digital driving signals that would avoid the fast recirculation condition are different for different zones of electrical position of the rotor.

8. The system of claim 7 wherein each of the converter circuits comprises a sigma delta converter circuit.

9. The system of claim 7 wherein the digital driving signals are uncorrelated with one another.

10. The system of claim 7 wherein the plurality of power generation circuits is configured to be coupled to a universal serial bus (USB) voltage.

11. The system of claim 7 wherein each of the power generation circuits comprises a half bridge circuit.

12. The system of claim 7 wherein the fast recirculation compensation values are stored in a lookup table in the memory.

13. A method for using a plurality of power generation circuits each configured to drive a respective winding of a multiphase motor, and a plurality of converter circuits each configured to generate a digital driving signal for a respective power generation circuit, the method comprising:
storing in a memory a plurality of fast recirculation compensation values corresponding to combinations of the digital driving signals that would void a fast recirculation condition, wherein the fast recirculation condition comprises current circulating through a winding of the multiphase motor and through a power generation circuit of the plurality of power generation circuits back to a power source;
determining when a given combination of the digital driving signals would result in the fast recirculation condition; based upon the determination, substituting at least one corresponding fast recirculation compensation value for the given combination of the digital driving signals;
and driving respective power generation circuits with respective substituted digital driving signals;
wherein the multiphase motor comprises a rotor configured to rotate based upon the windings of the multiphase motor;
and wherein the combinations of the digital driving signals that would avoid the fast recirculation condition are different for different zones of electrical position of the rotor.

14. The method of claim 13 wherein each of the converter circuits comprises a sigma delta converter circuit.

15. The method of claim 13 wherein the digital driving signals are uncorrelated with one another.

16. The method of claim 13 wherein the plurality of power generation circuits are coupled to a universal serial bus (USB) voltage.

17. The method of claim 13 wherein storing comprises storing the fast recirculation compensation values in a lookup table in the memory.

* * * * *

UNITED STATES PATENT AND TRADEMARK OFFICE
CERTIFICATE OF CORRECTION

PATENT NO. : 9,780,703 B2
APPLICATION NO. : 14/824193
DATED : October 3, 2017
INVENTOR(S) : Giuseppe Maiocchi Page 1 of 1

It is certified that error appears in the above-identified patent and that said Letters Patent is hereby corrected as shown below:

In the Claims

In Column 7, Line 26-29, Claim 7, delete "and a controller coupled to the memory and configured to determine when a given combination of the digital driving signals would result in the fast recirculation condition, and the fast recirculation condition," and insert --and a controller coupled to the memory and configured to determine when a given combination of the digital driving signals would result in the fast recirculation condition,--.

In Column 8, Line 13, Claim 13, delete "void" and insert --avoid--.

In Column 8, Line 27-29, Claim 13, delete "wherein the multiphase motor comprises a rotor configured to rotate based upon the windings of the multiphase motor;" and insert --wherein the multiphase motor comprises a rotor configured to rotate based upon windings of the multiphase motor;--.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*